Oct. 18, 1938. H. F. JOHNSON 2,133,680
GAUGE PIN
Original Filed March 3, 1936
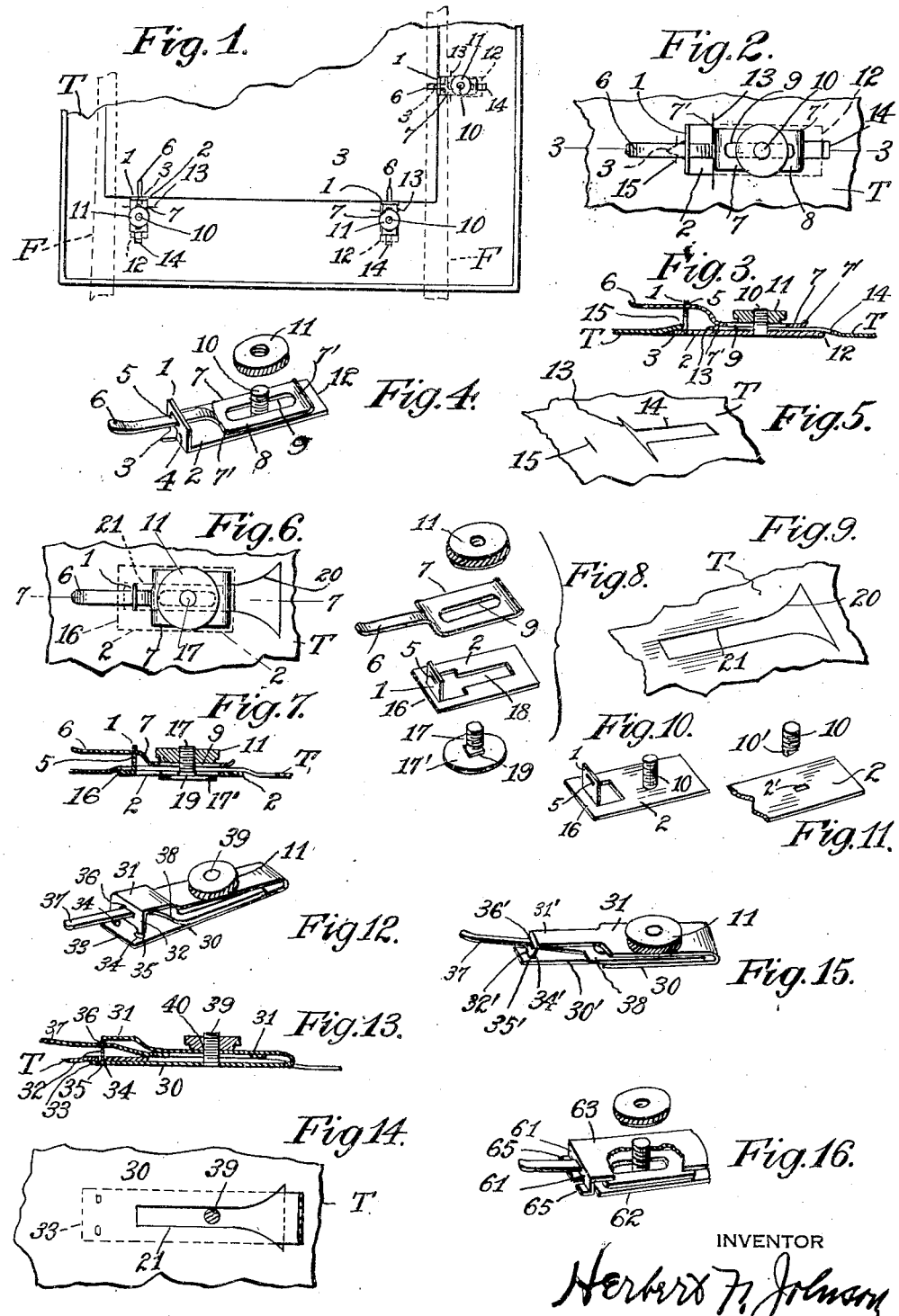
INVENTOR
Herbert F. Johnson Patented Oct. 18, 1938

2,133,680

UNITED STATES PATENT OFFICE 2,133,680

GAUGE PIN

Herbert F. Johnson, Pittsfield, Mass.

Application March 3, 1936, Serial No. 66,800
Renewed August 23, 1938

12 Claims. (Cl. 101—415)

This invention relates to printers' gauges such as used by printers to be attached to the tympan sheet of a printing press, to properly bring to a registered position the sheet to be printed with relation to the printing form or type matter. Gauges such as commonly used, after a short run become loose and are easily shifted out of position, and the stop face at the front of the gauge lifted to allow the sheets to be registered thereagainst, to slip under this front stop face resulting in faulty register. This is due to the majority of such devices being laced thru the tympan sheet in which they are inserted, depending on friction to hold the gauge in a set position. Such gauges will become loose after a short time and shift. It is an object therefore of this invention to provide a simple and durable gauge that will overcome these difficulties by introducing a clamping means to firmly hold the gauge in an adjusted position on the tympan sheet. This firm contact with the tympan sheet prevents shifting, and also tipping upward at the front end, a further provision is made for preventing this tipping upward of the gauge at the front end, by an extended portion of the gauge forward of the stop face, which portion being preferably a part of the stop face adapted to pass, under the tympan sheet. This stop face may be bent up from a base portion of the gauge, or bent down from a top portion of the gauge, in the latter form the lower end of the stop face may have an extending portion forward of the stop, or provided with piercing points that enter into the tympan sheet but which pass entirely thru the sheet so the points are below the top of the base, whereby this lower end of the stop, when carried by the top member is closed. The stop face in either case, has an aperture adjacent the upper end, thru which a hold down finger of narrow width is slidably arranged to be clamped rearward thereof by a wider portion having an elongated slot for adjustment and held in position by the aforesaid clamping means. A further object is obtained by the construction of my gauge, to provide a very narrow device, enabling the use of same in narrow margins, such as between close rule work.

Other objects will appear as this description proceeds and more fully pointed out, and claimed in connection with the accompanying drawing, of which, Fig. 1 is a plan view of a platen of a printing press with the tympan sheet in position and showing a set of gauges attached to the tympan sheet.

Fig. 2 is a plan view of one form of the gauge in position on a tympan sheet.

Fig. 3 is a longitudinal section, taken on line 3—3 of Fig. 2, of the gauge in position on the tympan sheet.

Fig. 4 is a perspective view of the gauge detached.

Fig. 5 is a perspective view of the tympan sheet to show how the sheet is slitted to receive the gauge, shown in Fig. 4, Fig. 6 is a plan view similar to Fig. 2, showing a slightly modified form of the gauge.

Fig. 7 is a longitudinal section, taken on line 7—7 of Fig. 6,

Fig. 8 is a dissassembled view of the parts of the gauge shown in Fig. 6,

Fig. 9 is a view of the tympan sheet showing how the sheet is slotted to receive the gauge shown in Fig. 6, Fig. 10 is a view of the base portion, the base similar to the one shown in Fig. 4, with a clamping stud affixed.

Fig. 11 is a detail view of the clamping stud and a portion of the base to show how the stud is fixed to the base.

Fig. 12 is a view of a gauge with a front stop carried by the top member of the gauge, and having piercing points at its lower end to enter openings in the base.

Fig. 13 is a longitudinal section of the gauge shown in Fig. 12, and shows the gauge in position on a tympan sheet.

Fig. 14 is a plan view of the tympan sheet, and showing the base of the gauge shown in Fig. 13, in position in the cut out portion of the tympan sheet, the top member of the gauge removed.

Fig. 15 is a perspective view of a gauge similar to Fig. 16, and shows a narrow front end to enable the use of the gauge between close rule work.

Fig. 16 is a view of the gauge and shows the top member and base member as separate members, the stop face being carried by the top member and has a forward extension of the stop, at the lower end, that is inserted under the tympan sheet to close the lower end.

As shown in the drawing several forms of my improved gauges are illustrated, one form provides a front stop face bent downward and carried by the top portion of the gauge, and in another form the stop face extends upward and carried by the lower portion, or base of the gauge.

The top and lower portions may be of one integral strip of material suitably bent approximately central of the strip so that the top part overlays the bottom part with the front end bent downward to form the front stop face with the front end of the lower base part extending forward and beyond the stop face. When the stop face is carried by the base portion, and formed from the base, the stop face likewise has this extended part of the stop forward thereof. It may be preferable to form the gauge of one integral strip as stated, this however is not essential as a separate top and bottom member may serve the same purpose, since in all cases a clamping means is provided to draw the top and base members into close relation with the tympan sheet interposed. The extended portion of the base, that part forward of the stop face is slipped under the tympan sheet, and prevents sheets to be registered from passing under the stop. To prevent the sheets riding over the top of the stop face, a hold down member is provided, having a finger of narrow width at the forward end which is passed thru an aperture formed in the stop face adjacent the upper end thereof, and the finger terminates in a wider portion having an elongated slot thru which a threaded stud fixed to or otherwise carried by the base passes and also thru the top portion of the gauge, when this top portion is used, the top portion may be omitted, and this wider portion of the hold down finger may serve as the top portion of the gauge, drawn down by a nut, a part of the clamping means, to clamp the members together on the tympan sheet, as will now be more fully described.

Referring particularly to Figs. 1 to 5 inclusive, in which the aforesaid front stop face, indicated at 1, is bent upward from the base portion 2, as in Figs. 2, 3, and 4 by a stamping operation, to separate the metal from the stop and retain a forward extending part of the base, as at 3, which front part slides under the tympan sheet, when the gauge is in position thereon, and thereby prevent sheets to be printed passing under the stop face at the lower end. At the top of the stop, and above an open part 4 made in the front face by the separation and bending upward of this stop face away from the base, an aperture 5 is provided through which extends a narrow finger portion 6 of a hold down member 7 that is slidable and adjustable lengthwise of the base. This narrow finger terminates rearward thereof in a wider portion 8 having an elongated slot 9 which wide portion serves as a clamping plate, with the base between which the tympan sheet is clamped and held firmly clamped by a threaded stud 10 fixed to the base, and a clamping nut 11. The hold down member with the slotted wide portion being adapted to slide forward and back on the base, and guided on the stud, the narrow finger at the same time adjusted by this movement thru the aperture 5, to any suitable position required. This hold down finger preventing sheets to be printed riding over the top of the stop. In Fig. 3 is clearly shown how the gauge is set and clamped to the tympan sheet, T, and in Fig. 5, is shown how the tympan sheet is slitted before applying the gauge. When the gauge is inserted, the rear end 12 of the base of the gauge is slipped under thru a slit 13 made in the tympan sheet, rearward of which a cut out portion central of the slit 13 is removed to provide a slot 14 of a length and width to freely clear the threaded stud 10 and permit of the base being moved under the tympan sheet, by entering the slot 13 to a position rearward of the slot 14 so the front extended part 3 of the base is in the rear of a small slit 15 cut in the tympan sheet, the gauge is then moved forward and the extended end 3 pushed under the tympan sheet thru the slit 15, as clearly shown in Fig. 3. The hold down member may be in position on the base when entering, or may be removed and placed in position after the base of the gauge is inserted under the tympan sheet. The wide part of the hold down member at each end, may be curved upward, as at 7' to provide free sliding action on the tympan sheet, whereby free adjustment of the gauge may be made, the stop face 1 may be regulated within certain limits by moving the base in the tympan slot 14, and the finger extending thru the aperture adjusted to suit on the base, then the clamping nut 11 turned to tighten and clamp the parts in their adjusted position to firmly hold the gauge in adjusted position, as will be readily understood.

In Figs. 6, 7 and 8, I show a slight modified form over the foregoing views, here the base portion 2 has the stop face 1 bent up from the inner part of the body of the base, as by shearing the metal and bending this part forming the sides and top of the stop upward which will form the stop as best seen in Fig. 8, a short distance from the front end of the base to provide a forward extension 16 of the base, the entire width thereof, which base as in the former showing is preferably formed of strip material. Instead of a stud fixed to the base as in Fig. 4, I may use, as here shown, a separate screw 17, having a head 17', that enters a slotted portion 18 of the base from the underside and passing thru a hold-down member 7 constructed like the hold-down member shown in Fig. 4, the narrow part 6 of which passes thru an aperture 5 of the stop face. The lower end of the screw 17 may be flatted as at 19 to prevent rotation in the slot 18 when clamping the parts together by the threaded nut 11. In this form of the gauge, the tympan sheet is provided with a cut out portion, see Fig. 9, being in the nature of a slotted cut, wide at one end, as at 20 to provide an entrance of the gauge from the front end thereof, the slot merging into a narrow part 21, the base part and the screw head passing under the tympan sheet and the hold-down member above, slipping the gauge fully forward so the forward extended part 16 of the base is under the tympan sheet, as clearly shown in Fig. 7. In Fig. 10, I show the base 2 with the stud 10 attached to the base, and may be used as in Fig. 4, in connection with the showing of Fig. 6 and become the preferred form of my gauge. The stud forming a part of the clamping means, may be affixed to the base in any suitable manner. I prefer however to form an elongated slot 2' in the base, see Fig. 11 and by a flatted portion of the stud as at 10', which portion enters the slot, and headed over, will firmly hold the stud and prevent rotation, when the nut 11 is turned thereon to clamp the parts to the tympan sheet. Having described the gauge in which the base portion has the stop face bent upward therefrom with an extending part of the base forward of the stop, which part enters under the tympan sheet to positively close the lower end of the stop, preventing sheets to be registered passing under the gauge, and further prevent tipping up at the front end. I will now describe the showing of Figs. 12 to 16, inclusive, how I may construct my gauge with the stop face carried by the top member of the gauge which stop face is bent downward from the top member. In Figs. 12, 13 and 14, the gauge is shown formed from a strip of suitable width bent approximately central of the strip to form a base portion 30, and a top overhanging portion 31, the free end of the top portion being bent downward to form the stop face 32, with the front face thereof which is rearward of the lower front end of the base, to provide a forward extension of the base. The lower end of the stop face is provided with piercing points 34 or projections, which enter cut outs, or apertures 35 of the base that will permit of the stop face with the piercing points entering into the base, to close the lower end of the stop. The stop face adjacent the top is provided with an aperture 36, thru which the narrow part 37 of a hold-down member 38 which has a slotted wide portion, as in the former showing, except that here this hold-down finger is placed between the top and bottom members of the gauge, for adjustment on a clamping stud 39, which stud is fixed to the base and extends upward thru an aperture 40 in the top member, which top and lower members are drawn together by a nut 11, and thereby clamp the hold down member in any adjusted position between said members. Before clamping the gauge to the tympan sheet the normal position of the top member at the front end with the stop face is free and open, as in Fig. 12, by a spring action upward of the top member to permit ready entrance into a cut out formed in the tympan sheet T, as shown in Fig. 14. This will be more readily understood by reference to Fig. 13, in which the front end 33 of the base portion of the gauge is moved somewhat further forward to have the piercing points 34 of the top stop, and the cut out portion of the base into which the piercing points enter under that part of the tympan sheet forward of the narrow slotted part 21 of the tympan sheet, as clearly shown in Fig. 14. The clamping means being the same as in the former showing, except that the threaded stud 39 passes thru an aperture 40 in the top member of the gauge, see Fig. 13, and when the gauge is clamped to the tympan sheet the wide part of the hold-down member is above the sheet and the base of the gauge under the sheet. In Fig. 15, the gauge similar to the gauge shown in Fig. 12, is shown very narrow at the front end, both the base and the top portions, the base as at 30', and the top, at 31', at the rear end both these members are wide, to provide more clamping surface between same, and for the slotted hold-down member, which is adjustably mounted between the top and base, as in Fig. 12. The stop face 32' has a single piercing point 34', that enters a single cut out 35' in the base, the narrow finger portion of the hold-down member passing thru an aperture 36'. This form of the gauge will permit the front end thereof to be placed between rules when locked in a printing form, which rules generally extend beyond the sheet to be printed, between which the narrow end of the gauge may be set and adjusted. In Fig. 16, is shown the type of gauge with the stop face 61 bent downward from the top member, here the base 62 and top member 63 are shown as separate members, that is, not being formed from a single strip. The gauge so constructed is very simple and may be relatively short as compared to the one piece type, the clamping means and hold down member being the same as in Fig. 12. The front stop face 61, it will be particularly noted has a forward extension 65 which is adapted to be pushed under the tympan sheet to positively close the lower end of the stop. From the foregoing it will be seen, my gauge, in all the forms thereof herein shown, provides a base member and a top member formed from a single strip as by bending the strip to have the top overlay the bottom member, or by two separate members, adapted to be clamped together by a suitable clamping means. A stop face bent up from the base, or bent down from the top member, in either case has an extended portion of the stop forward thereof. This extended portion is always under the tympan sheet, and it will be noted when the stop extends up from the base the bottom of the stop is closed and sheets to be printed registered against the same cannot pass under, and when the stop is carried by the top portion the piercing points pass thru the tympan sheet and below the top of the base extension to thus close the lower end of the stop. The forward extension of the base being under the tympan also serves to hold the front end of the gauge from tipping up, which is a fault with many gauges now in use. The hold-down member with the narrow finger portion passing thru the aperture at the top of the stop face closes the top, and it will be obvious the wide portion of the hold-down member, may serve as the top member of the gauge.

Having described my invention I claim:

1. A printer's gauge, comprising a base member and a top member, said base having a stop face adjacent the front end thereof, and an extended portion of the base forward of the stop, an aperture in the stop face for the reception therethru and slidable therein of a narrow portion of the top member, and a wide slotted portion thereof adjustably mounted on the base whereby said top member has a relative movement longitudinally of the base, and means to clamp the members together on the tympan sheet with the front extended end of the base and the rear top sides thereof under the tympan sheet, and the top member on top of the sheet, substantially as specified.

2. A printer's gauge, comprising a base portion the forward end slitted and bent upward to provide a stop face rearward of the front end of the base, an aperture in the front face adjacent the top thereof, a threaded stud fixed to the base, a slotted hold down member slidably arranged to straddle the stud and ride on the base having a narrow portion adapted to pass thru said aperture of the stop face, and means to clamp the hold down member and base in adjusted position in a slotted portion of the tympan sheet with the sides of the sheet, each side of the slotted portion between the hold down member and the base, and the front end of the base under the tympan sheet to close the lower end of the stop.

3. A printer's gauge, comprising a base member, and a hold-down member, said base member having a stop face at the front end thereof, and an extended portion forward of the stop, adapted to pass under the tympan sheet, through a slotted portion thereof, through which the base of the gauge is entered and moved forward to have the front extended end of the base under a slitted portion crosswise of and forward of the slotted part of the tympan sheet, an aperture in the upper end of the stop face, and a threaded stud carried by the base and located rearwardly of the stop, on which said hold-down member having a wide slotted part straddles the stud and rides on the base, and a narrow portion of the hold-down member passing through the aperture of the stop for longitudinal adjustment of the hold-down member on the base, and a threaded nut to co-operate with the stud to clamp the members in their adjusted position to the tympan sheet, substantially as specified.

4. A printer's gauge, adapted to be adjustably attached to a tympan sheet of a printing press, comprising a base member the front of which has a portion thereof bent upward to provide a stop face formed from a notched portion of the base, so the end of the base extends forward of the stop face, and in a plane with the base, an aperture through the stop adjacent the top thereof, a threaded upstanding stud carried by the base and held against rotation therein, a slidable hold-down member, having a narrow finger portion, adapted to slide through said aperture, and a wide portion rearward thereof having an elongated slot slidably arranged on the stud and the base, and means to clamp the hold-down member in adjusted position to the base, with the tympan sheet which is slitted crosswise to a slotted portion thereof to enable the base member to be inserted with the forward end under the slitted portion of the tympan sheet, and the rear portion of the base under the slotted portion of the sheet, and the hold-down member above the sheet.

5. A printer's gauge, comprising a body member of strip material, having a portion forming the base of the gauge, a threaded stud carried by the base extending upward therefrom, and fixed against rotation therein, a bent portion of the strip to form a vertical wall crosswise of the strip at the forward end of the gauge, to provide a stop face with a portion of the strip extending forward of the stop face to close the bottom of the stop, an aperture at the upper end of the stop face, a hold-down member having a narrow finger portion, and a wide slotted portion, said narrow portion adapted to enter the aperture in the stop face, and said wide slotted portion straddle the stud and ride on the base for longitudinal adjustment thereon, said wide portion adapted to be clamped to the base with the tympan sheet between the top of the base and under the wide portion of the hold-down member, a threaded nut to co-operate with the stud to draw the hold-down member and base in clamped relation to the tympan sheet.

6. A printer's gauge, comprising a body member of strip material, having a portion forming the base of the gauge, and an overlaying portion forming the top of the gauge, a threaded stud carried by the base, and extending upward through the base and through the top overlaying portion, said stud fixed against rotation in the base, a bent portion of the strip to form a vertical wall crosswise of the strip at the forward end of the gauge, to provide a stop face with a portion of the strip extending forward of the stop, said stop face having projections at the lower end thereof to enter open places in the base, to close the bottom of the stop, an aperture at the upper end of the stop face, a hold-down member, having a narrow finger portion, and a wide slotted portion, said narrow portion adapted to enter the aperture in the stop face, and said wide slotted portion straddle the stud and ride on the base for longitudinal adjustment thereon, and said wide portion adapted to be clamped to the base, with the tympan sheet between the top of the base and under the wide portion of the hold-down member, a threaded nut to co-operate with the stud to draw the said hold-down member and base into clamped relation.

7. A printer's gauge, comprising a supporting member, and a hold-down member, said supporting member forming the base of the gauge, and having a portion thereof adjacent the front end bent upward to provide a stop face, with a portion of the base extending forward of the stop, whereby the bottom of the stop is closed, a threaded stud carried by the base and located rearwardly of the stop, an aperture at the top of the stop to receive therein and slidable therethrough a narrow finger portion of the hold-down member, which member also has a wide slotted portion, adapted to straddle the stud and ride on the base, a threaded nut to co-operate with the stud to clamp the members in their adjusted position to a tympan sheet.

8. A printer's gauge, comprising a base member, and a top member, preferably formed from strip material, a bent portion of the top member to take a vertical position adjacent the front end of the gauge, to form a stop face with the lower end thereof closed by a forward bent extension of the stop face in line with an extended portion of the base, an aperture at the upper end of the stop, a threaded stud carried by the base, located at the rearward end thereof and extending upward through an aperture of the top member, a hold-down member, having a narrow finger portion, adapted to pass through the aperture of the stop face, and a wide slotted portion, adapted to straddle the stud and ride on the base for longitudinal adjustment of the hold-down member on the base, a threaded nut to co-operate with the stud, to clamp the members in their adjusted position to a tympan sheet with the front extended ends of the base and the stop, and the rearward portion of the base under the tympan sheet, and the underside of the hold-down member on the top of the sheet, substantially as specified.

9. A printer's gauge, comprising a body member of strip material, forming the base of the gauge, and an overlying top member forming the top of the gauge, a stop face carried by the top member at the front thereof, said stop closed by a forward extended portion of the stop, and an extended portion of the base, forward of the stop, together with the full length of the base adapted to pass under the tympan sheet to close the lower end of the stop, and provide a clamping surface along the full length thereof at each side of a stud fixed to the rear of the base, which stud extends upward, and passes thru an aperture in the top member, an aperture in the top of the stop face, for the reception therethru and slidable therein, of a narrow finger portion of a hold-down member, the rear end of which is provided with a wide slotted portion by which same is guided and adapted to slide on the base, between said base and top member, means to clamp the members in the order stated to the tympan sheet, including a threaded nut to engage the stud on top of the top member, to draw the members in clamped position, with both the extending ends of the base and stop under the tympan sheet, with the hold-down member on the top of the sheet.

10. A printer's gauge, comprising a one piece body member of strip material bent approximately central of its length to form a base portion, and an overlaying top portion, the free ends of which form the front of the gauge, a stop face bent downward from the top portion, with the lower end of the stop provided with piercing points, adapted to enter open places in the base, to close the lower end of the stop, a threaded stud fixed to the base, extending upward thru an aperture in the overlaying portion, and an aperture in the stop face adjacent the top thereof, for the reception of and slidable therein, of a narrow finger portion of a hold-down member, said member having a wide slotted portion to engage over and be guided by the stud at this end, between the top and base portions, to slide on the base, for adjustment of the finger, and further serve as a clamping member together with the base, a threaded nut to engage the stud on top of the top portion, to draw the top and base portions together, to close the stop, and clamp the members to the tympan sheet in the order stated, in a slotted part of the tympan sheet, the base under the tympan forward of said slotted part, and at the rear part of the base each side of the stud, the full length thereof, with the hold-down member in its adjusted position on top of the tympan sheet.

11. A printer's gauge, comprising a one piece body member of strip material bent approximately central of its length to form a base portion, and an over-laying top portion, the free ends of which form the front of the gauge, said front ends of narrow width as compared to the rearward part of the strip to provide entrance of this narrow portion between overhanging portions such as rule ends, of the printing form, a stop face bent downward from the top portion, with the lower end of the stop, provided with a piercing point, adapted to enter an open place in the base to close the lower end of the stop, a threaded stud fixed to the rear and wide part of the base, extending upward and thru an aperture in a correspondingly wide part of the overlying top portion, and an aperture in the stop face adjacent the top thereof, for the reception and slidable therein, of a narrow finger portion, of a hold-down member, said member having a wide slotted portion, to engage over and be guided by the stud at this end, between the top and base portions to slide on the base for adjustment of the finger, and further serve as a clamping member together with the base, a threaded nut to engage the stud on top of the top portion, to draw the top and base portions together, to close the stop, and clamp the members to the tympan sheet, in the order stated, in a slotted part of the tympan sheet the base under the tympan, forward of the slotted part, and the rear part of the base each side of the stud the full length thereof, with the hold-down member in its adjusted position on top of the tympan sheet.

12. A printer's gauge, for use in registering sheets to be printed, comprising a pair of clamping members, including a base member, and a top member, said base of flat material having a stop face bent up at the front end thereof, and an aperture thru the stop, a stud fixed to the base, located rearward of the stop and extending upward therefrom, and passing thru an elongated slot of the top member, which top member has a narrow finger portion adapted to slide in the aperture of the stop face for longitudinal adjustment of said top member on the base, and guided in said adjustment by the finger and the stud, means connected with the stud to draw the top and base into clamped relation.

HERBERT F. JOHNSON.